(12) United States Patent
Goto

(10) Patent No.: US 10,397,029 B2
(45) Date of Patent: Aug. 27, 2019

(54) RELAY APPARATUS

(71) Applicant: Toshiba Memory Corporation, Minato-ku, Tokyo (JP)

(72) Inventor: Masataka Goto, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 354 days.

(21) Appl. No.: 14/950,770

(22) Filed: Nov. 24, 2015

(65) Prior Publication Data

US 2017/0012828 A1 Jan. 12, 2017

Related U.S. Application Data

(60) Provisional application No. 62/189,797, filed on Jul. 8, 2015.

(51) Int. Cl.
*H04B 3/36* (2006.01)
*H04L 25/20* (2006.01)

(52) U.S. Cl.
CPC ............. *H04L 25/20* (2013.01); *H04B 3/36* (2013.01)

(58) Field of Classification Search
USPC ........................................................ 709/223
See application file for complete search history.

(56) References Cited

U.S. PATENT DOCUMENTS

| | | | |
|---|---|---|---|
| 6,950,871 B1 | 9/2005 | Honma et al. | |
| 7,072,965 B2 | 7/2006 | Ryuutou et al. | |
| 8,326,916 B2 | 12/2012 | Yamazaki et al. | |
| 2003/0140051 A1 | 7/2003 | Fujiwara et al. | |
| 2003/0218996 A1 | 11/2003 | Sumino et al. | |
| 2004/0019655 A1 | 1/2004 | Uemura et al. | |
| 2005/0160222 A1* | 7/2005 | Innan .................... | G06F 3/0605 711/114 |
| 2007/0233844 A1* | 10/2007 | Tanimoto ............ | H04L 67/1095 709/223 |
| 2008/0095089 A1* | 4/2008 | Nishiyama ............ | H04W 74/04 370/311 |
| 2009/0063719 A1* | 3/2009 | Honjo ................. | G06F 11/0727 710/8 |
| 2013/0046875 A1* | 2/2013 | Shinozaki ............. | G06F 3/0607 709/223 |
| 2013/0110780 A1* | 5/2013 | Miyoshi ................ | G06F 3/0605 707/634 |

(Continued)

FOREIGN PATENT DOCUMENTS

| | | |
|---|---|---|
| JP | 10-198642 A | 7/1998 |
| JP | 2002-190821 A | 7/2002 |

(Continued)

*Primary Examiner* — Hermon Asres
(74) *Attorney, Agent, or Firm* — White & Case LLP

(57) ABSTRACT

According to one embodiment, a relay apparatus is connectable to a server and a plurality of storage devices. The relay apparatus includes a storage unit, a transfer destination management unit, and a transfer unit. The storage unit stores first information including information of the plurality of storage devices therein. The transfer destination management unit identifies a first storage device among the plurality of storage devices based on the first information in response to receiving a request from the server. The transfer unit transfers the received request to the first storage device.

11 Claims, 11 Drawing Sheets

(56) References Cited

U.S. PATENT DOCUMENTS

2013/0226969 A1\* 8/2013 Takase .................... G06F 16/27
707/781
2014/0258377 A1\* 9/2014 Matsumura ....... H04L 29/06047
709/203

FOREIGN PATENT DOCUMENTS

| JP | 2003-110622 A | 4/2003 |
| JP | 2006-215635 A | 8/2006 |
| JP | 2006-228243 A | 8/2006 |
| JP | 2011-034444 A | 2/2011 |
| JP | 2012-174020 A | 9/2012 |

\* cited by examiner

FIG.6

| IP ADDRESS OF DRIVE | PORT NUMBER OF DRIVE | KEY RANGE (LOWER THREE BITS) | SOCKET DESCRIPTOR (INITIAL VALUE IS nil) |
|---|---|---|---|
| 192.168.0.1 | 6000 | 000 | 3 |
| 192.168.0.2 | 6000 | 001 | 4 |
| 192.168.0.3 | 6000 | 010 | 5 |
| 192.168.0.4 | 6000 | 011 | 6 |
| 192.168.0.5 | 6000 | 100 | 7 |
| 192.168.0.6 | 6000 | 101 | 8 |
| 192.168.0.7 | 6000 | 110 | 9 |
| 192.168.0.8 | 6000 | 111 | 10 |

FIG.7

| SOCKET DESCRIPTOR OF LOGICAL CONNECTION ON SERVER SIDE | SOCKET DESCRIPTOR OF LOGICAL CONNECTION ON DRIVE SIDE |
|---|---|
| 11 | 3 |
| 12 | 8 |
| 13 | 4 |
| | |
| | |
| | |
| | |
| | |
| | |

| SOCKET DESCRIPTOR OF LOGICAL CONNECTION ON SERVER SIDE | SOCKET DESCRIPTOR OF LOGICAL CONNECTION ON DRIVE SIDE | REQUEST KEY |
|---|---|---|
| 11 | 3 | 0x12345678 |
| 12 | 8 | 0x0123abcd |
| 13 | 4 | 0x38702121 |
| 11 | 8 | 0x71dbca95 |
| | | |
| | | |
| | | |
| | | |
| | | |
| | | |

RELAY APPARATUS

CROSS-REFERENCE TO RELATED APPLICATIONS

This application is based upon and claims the benefit of priority from U.S. Provisional Application No. 62/189,797, filed on Jul. 8, 2015; the entire contents of which are incorporated herein by reference.

FIELD

Embodiments described herein relate generally to a relay apparatus.

BACKGROUND

Conventionally, a storage drive may be connected to a large number of servers through a network. In general, information processing ability of the storage drive is not so high and a work storage area included in the storage drive is restricted. Therefore, frequent establishment and frequent disconnection of logical connection by the large number of servers frequently and a necessary memory resource for connection to the large number of servers cause a decrease in an input/output speed of data to/from the storage drive.

BRIEF DESCRIPTION OF THE DRAWINGS

FIG. 6 is a diagram illustrating a data configuration example of a drive connection table;

FIG. 7 is a diagram illustrating a data configuration example of a transfer correspondence table of the first embodiment;

DETAILED DESCRIPTION

In general, according to one embodiment, a relay apparatus is connectable to a server and a plurality of storage devices. The relay apparatus includes a storage unit, a transfer destination management unit, and a transfer unit. The storage unit stores first information including information of the plurality of storage devices therein. The transfer destination management unit identifies a first storage device among the plurality of storage devices based on the first information in response to receiving a request from the server. The transfer unit transfers the received request to the first storage device.

Hereinafter, the relay apparatus according to embodiments of the present invention will be described in detail with reference to the drawings. The present invention is not limited by the embodiments.

First Embodiment

Figure 1:
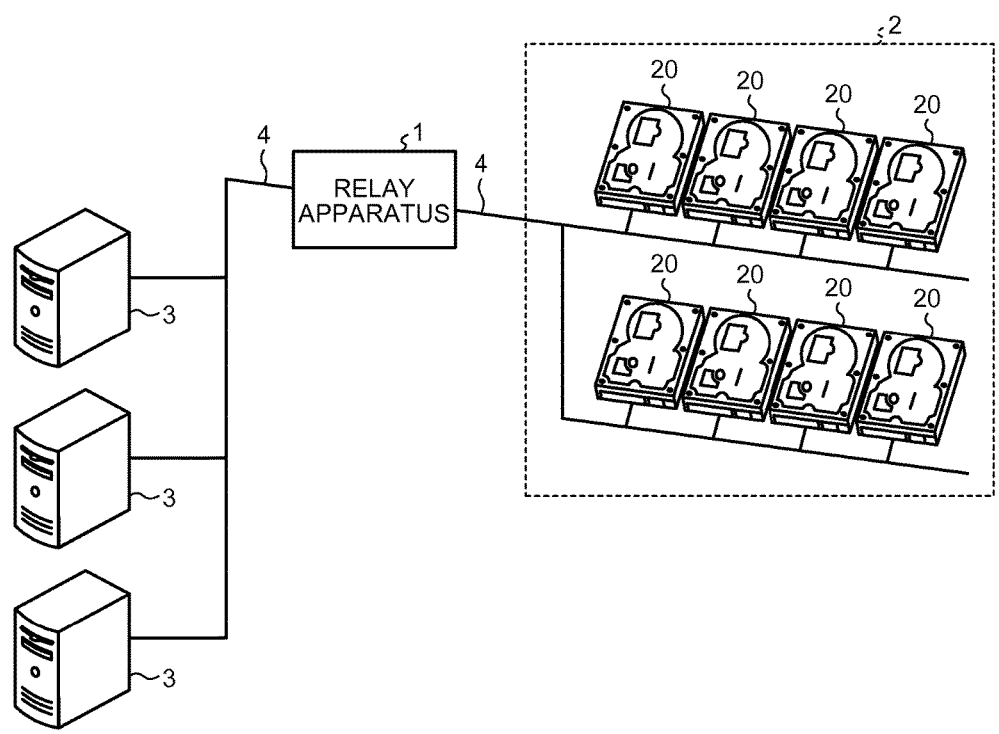
FIG. 1 is a diagram illustrating an example of physical connection between devices including a relay apparatus of a first embodiment.

FIG. 1 is a diagram illustrating an example of physical connection between devices including a relay apparatus of a first embodiment. The relay apparatus 1 is connected to a plurality of storage drives (hereinafter referred to as drives) 20 through a communication line 4. Further, the relay apparatus 1 is connected to a plurality of servers 3 through the communication line 4. In the example of FIG. 1, the relay apparatus 1 is connected to eight drives 20 and three servers 3. The eight drives 20 connected to the relay apparatus 1 may be referred to as a drive group 2. Each drive 20 internally stores data from any of the servers 3. Each of the servers 3 is a computer which can supply a service to a user in response to a request from the user. A personal computer, a mobile computer, or a smart phone may be included in the servers 3.

As a standard of the communication line 4, any standard may be employed. For example, Ethernet (registered trademark) is employed as a standard of the communication line. As a communication protocol used on the communication line 4, any communication protocol can be employed as far as the communication protocol can establish and disconnect a logical connection. The logical connection is a connection generated in a transport layer. The logical connection connects between two programs each running on different devices respectively. Here, it is assumed that TCP/IP is employed as the communication protocol. In other words, here, the logical communication is TCP connection.

One connection line whose one end is connected to the relay apparatus 1 is branched into three lines by a hub not illustrated in the drawings and each of the three lines is connected to one of three servers 3. The other connection line whose one end is connected to the relay apparatus 1 is also branched into eight lines and each of the eight lines is connected to one of eight drives 20, respectively. Each server 3 can perform data access with respect to the drive group 2. It is assumed herein that the drive group 2 manages data by using a method of KVS (Key-Value Store). In other words, each server 3 transmits a request including a key. The request includes a read request and a write request. Here, the read request will be described as an example. The key included in the request is referred to as a request key.

Figure 2:
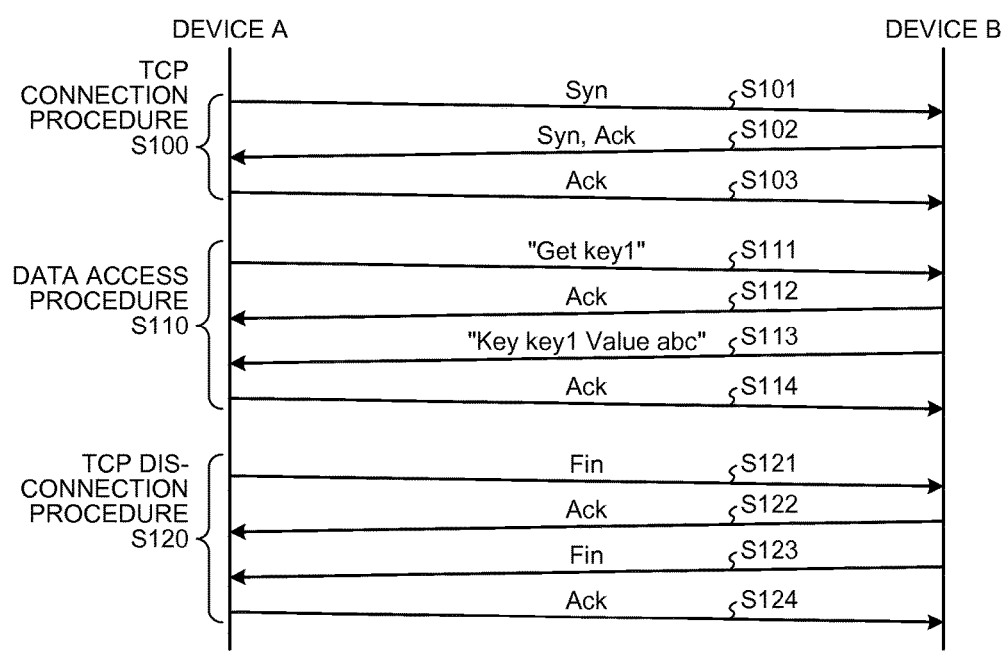
FIG. 2 is a diagram illustrating a general communication sequence between devices.

FIG. 2 is a diagram illustrating a general communication sequence between devices. Here, it is assumed that communication is performed from a device A to a device B. First, the device A performs a TCP connection procedure (S100) between the device A and the device B. The TCP connection procedure is a procedure for the device A to establish a logical connection between the device A and the device B. A TCP disconnection procedure (S120) described later is a procedure for the device A to disconnect the logical connection between the device A and the device B. An application of the device A and an application of the device B can transmit and receive information by using the established logical connection.

In the TCP connection procedure, first, the device A transmits Syn to the device B (S101). The device B transmits Syn and Ack to the device A in response to reception of Syn (S102). The device A transmits Ack to the device B in response to reception of Syn and Ack (S103). Syn, Ack, and Fin, which is to be described later, are control data defined by TCP. The logical connection between the device A and the device B is established by processing of S101 to S103. When the device B establishes the logical connection between the device A and the device B, the transmission direction of various control data in S101 to S103 is opposite to the transmission direction described above.

When the logical connection between the device A and the device B is established, the device A and the device B become able to perform transmission and reception of data by using the logical connection (data access procedure (S110)). In the data access procedure, for example, the device A transmits "Get key1", which is a read request including a character string "key1" as a request key, to the device B (S111). The device B transmits Ack for the received request to the device A (S112). Further, the device B transmits "Key key1 Value abc", which is a response including data "abc" corresponding to the request key "key1", to the device A (S113). The device A transmits Ack for the received response to the device B (S114).

When the data access procedure ends, the device A can start a TCP disconnection procedure (S120) to disconnect the logical connection between the device A and the device B. In the TCP disconnection procedure, the device A transmits Fin to the device B (S121). The device B transmits Ack to the device A in response to reception of Fin (S122) and thereafter transmits Fin to the device A (S123). The device A transmits Ack to the device B in response to reception of Fin (S124), and the disconnection of the logical connection between the device A and the device B is completed.

Figure 3:
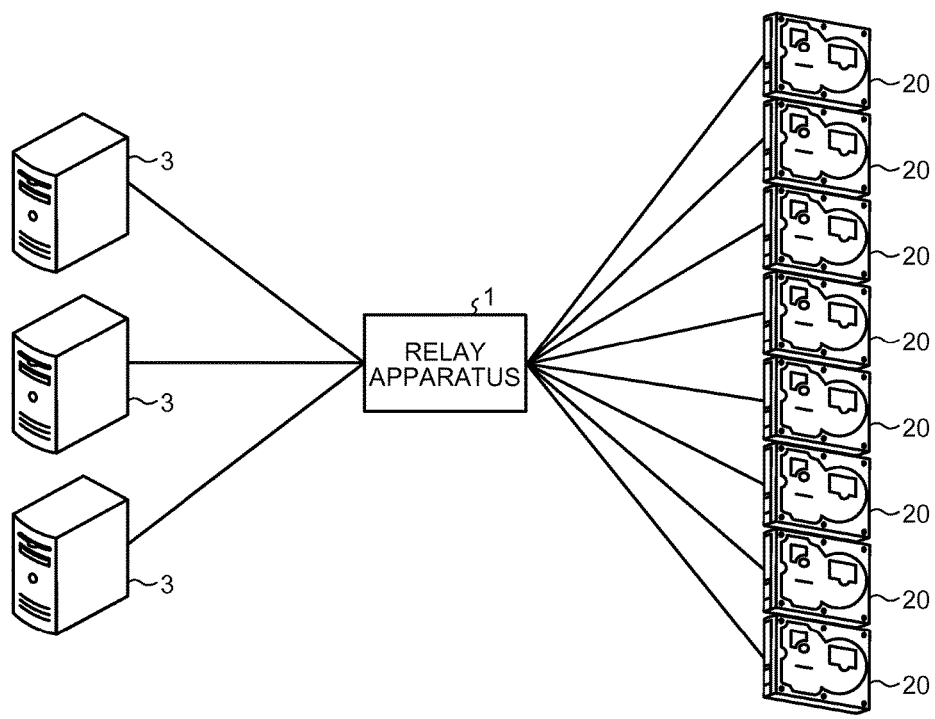
FIG. 3 is a diagram illustrating a logical connection established between devices including the relay apparatus of the first embodiment.

FIG. 3 is a diagram illustrating a logical connection established between devices including the relay apparatus 1 of the first embodiment. In the present embodiment, each server 3 establishes a logical connection with the relay apparatus 1, and the relay apparatus 1 establishes a logical connection with each drive 20. Each drive 20 is connected to the relay apparatus 1 by one logical connection, and each drive 20 can transmit and receive data to and from each server 3 through the relay apparatus 1. The relay apparatus 1 relays transmission and reception of information between a plurality of servers 3 and a plurality of drives 20. Thereby, it is possible to reduce the number of logical connections connected to each drive 20 as compared with when each drive 20 is directly connected to each server 3.

Figure 4:
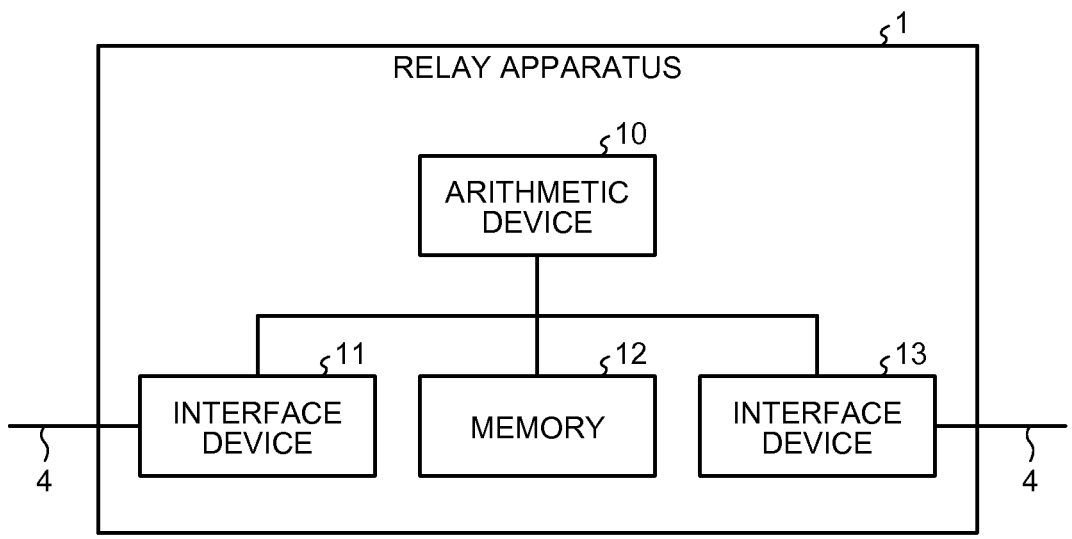
FIG. 4 is a diagram illustrating an example of a hardware configuration of the relay apparatus of the first embodiment.

FIG. 4 is a diagram illustrating an example of a hardware configuration of the relay apparatus 1 of the first embodiment. The relay apparatus 1 includes an arithmetic device 10, an interface device 11, a memory 12, and an interface device 13. The arithmetic device 10, the interface device 11, the memory 12, and the interface device 13 are connected to each other by a bus.

The memory 12 can store data therein. The memory 12 is formed by, for example, a RAM (Random Access Memory), a ROM (Read Only Memory), a magnetic disk drive, an optical disk drive, a flash memory, or a combination of these. The arithmetic device 10 is a processor that executes a program. The arithmetic device 10 is, for example, a CPU (Central Processing Unit). The arithmetic device 10 realizes each function of the relay apparatus 1 based on the program.

For example, the program is stored in the memory 12 in advance. The interface device 11 is a device which is connected to each server 3 through the communication line 4 and which performs control of the communication line 4. The interface device 13 is a device which is connected to each drive 20 through the communication line 4 and which performs control of the communication line 4. Here, the interface devices 11 and 13 conform to Ethernet (registered trademark). The interface devices 11 and 13 may be included in the relay apparatus 1 as one device.

Figure 5:
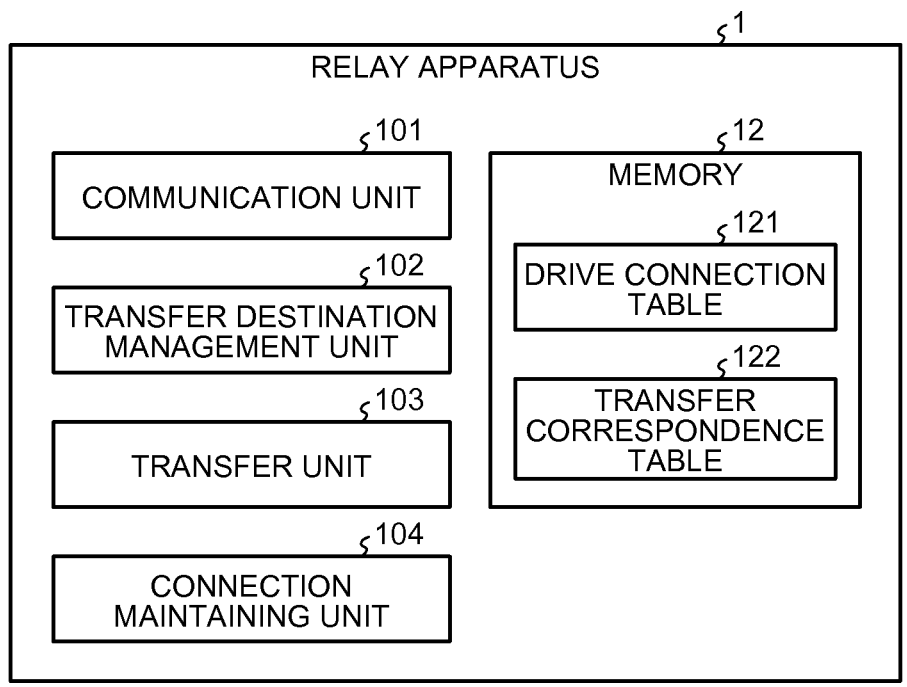
FIG. 5 is a diagram illustrating an example of a functional configuration of the relay apparatus of the first embodiment.

FIG. 5 is a diagram illustrating an example of a functional configuration of the relay apparatus 1 of the first embodiment. The relay apparatus 1 includes a communication unit 101, a transfer destination management unit 102, a transfer unit 103, and a connection maintaining unit 104. In the memory 12, a drive connection table 121 and a transfer correspondence table 122 are stored.

Here, it is assumed that the communication unit 101, the transfer destination management unit 102, the transfer unit 103, and the connection maintaining unit 104 are realized by execution of a program by the arithmetic device 10. However, a part or all of the communication unit 101, the transfer destination management unit 102, the transfer unit 103, and the connection maintaining unit 104 may be realized by a hardware circuit or a combination of software and hardware. For example, the communication unit 101 may be realized by a hardware circuit. The transfer destination management unit 102 may be realized by a hardware circuit. The transfer unit 103 may be realized by a hardware circuit. The connection maintaining unit 104 may be realized by a hardware circuit. Two or more components of the communication unit 101, the transfer destination management unit 102, the transfer unit 103, and the connection maintaining unit 104 may be realize by one component. Any one of the communication unit 101, the transfer destination management unit 102, the transfer unit 103, and the connection maintaining unit 104 may be divided into two or more components. The relay apparatus 1 may have multiple devices, and the communication unit 101, the transfer destination management unit 102, the transfer unit 103, and the connection maintaining unit 104 may be realized by the multiple devices.

The communication unit 101 is a processing unit that performs TCP/IP communication on the communication line 4 by controlling the interface devices 11 and 13. The communication unit 101 is realized by based on, for example, an operating system program. The communication unit 101 may be divided into two units, namely, a communication unit for Ethernet (registered trademark) segment on the side of the servers 3 and a communication unit for Ethernet (registered trademark) segment on the side of the drives 20, and may be included in the relay apparatus 1.

The transfer unit 103 transfers information received from the server 3 to the drive 20 and transfers information received from the drive 20 to the server 3. A request received from the server 3 and a response received from the drive 20 correspond to the information mentioned here. The term "Transfer" means to receive information from one instrument and transmit the received information to another instrument. One of a plurality of logical connections that are respectively connected to different drives 20 and one of a plurality of logical connections that are respectively connected to different servers 3 are used for one time transfer through the relay apparatus 1. A logical connection used for reception of information to the relay apparatus 1 in one time transfer is referred to as a transfer source logical connection. A logical connection which the relay apparatus 1 uses to transmit information in one time transfer, in other words, a logical connection which the relay apparatus 1 uses to transmit information received by the relay apparatus 1 to a transfer destination, is referred to as a transfer destination logical connection. The logical connection connected to the drive 20 may be referred to as a drive side logical connection. The logical connection connected to the server 3 may be referred to as a server side logical connection. The transfer unit 103 acquires an instruction of logical connection of transfer destination from the transfer destination management unit 102.

When the transfer unit 103 receives a request from the server 3, the transfer destination management unit 102 identifies a logical connection of a transfer destination from among the plurality of logical connections connected respectively to different drives 20. The transfer destination management unit 102 identifies the logical connection of the transfer destination based on the drive connection table 121. The transfer destination management unit 102 gives an instruction of the identified logical connection of the transfer destination to the transfer unit 103.

FIG. 6 is a diagram illustrating a data configuration example of the drive connection table 121. In the drive connection table 121, an IP address of the drive 20, a port number of the drive 20, a range of key (a key range), and a socket descriptor are recorded for each drive 20. The key range of each drive 20 is set in the drive connection table 121. Each drive 20 stores data corresponding to a request key included in the set range. In the example of FIG. 6, the setting of the key range to each drive 20 is defined by the least significant three bits of the key. According to the example of FIG. 6, when the value of the least significant three bits of the request key is "000", data corresponding to the request key is stored in the drive 20 identified by an IP address "192.168.0.1".

The socket descriptor is identification information for uniquely identifying each logical connection connected to the relay apparatus 1. Any information that can uniquely identify each logical connection connected to the relay apparatus 1 can be employed instead of the socket descriptor. A part or all of the IP address of the drive 20, the port number of the drive 20, and the key range may be inputted by an administrator when, for example, the system is constructed, or may be automatically inputted by the relay apparatus 1. The system here includes the relay apparatus 1 and a plurality of drives 20. At the timing when the drive connection table 121 is generated, the socket descriptor has not been set. The socket descriptor is recorded in the drive connection table 121 by, for example, the connection maintaining unit 104.

Information included in the drive connection table 121 is not limited to the information described above. Each range may be recorded in the drive connection table 121 so that a range can be determined after a predetermined function is applied to the request key. That is, for example, after the predetermined function is applied to the request key and the request key is converted, the converted request key and the key range set to each drive 20 are compared. For example, the transfer destination management unit 102 applies a hash function to the request key and determines a range, in which the value of the least significant three bits of the request key to which the hash function is applied is included, from among a plurality of ranges set in the drive connection table 121.

When the transfer unit 103 receives a request from the server 3, the transfer destination management unit 102 acquires a request key included in the request from the server 3 and a socket descriptor indicating the logical connection used by the server 3 to transmit the request. The transfer destination management unit 102 acquires, from the drive connection table 121, a logical connection connected to the drive 20 of which the set range includes the acquired request key, and gives an instruction of the acquired logical connection to the transfer unit 103 as a logical connection of a transfer destination to transfer the request.

Further, when the transfer unit 103 transfers a request, the transfer destination management unit 102 records the logical connection on the server side used to transfer the request and the logical connection on the drive side used to transfer the request in the transfer correspondence table 122 in association with each other.

FIG. 7 is a diagram illustrating a data configuration example of the transfer correspondence table 122 of the first embodiment. In the transfer correspondence table 122, a pair of the socket descriptor indicating the logical connection on the server side and the socket descriptor indicating the logical connection on the drive side is recorded for each transfer of request. In other words, the transfer correspondence table 122 indicates a transfer path of request. The term "correspondence" means relationship between two logical connections forming one transfer path of one request. The term "transfer path" means a route of transferring information. Information included in the transfer correspondence table 122 is not limited to the information described above.

Further, when the transfer unit 103 receives a response from the drive 20, the transfer destination management unit 102 identifies the logical connection connected to the server 3 that is the transmission source of the request, based on the transfer correspondence table 122, in order to transfer the received response to the server 3 that is the transmission source of the request. Specifically, the transfer destination management unit 102 acquires a socket descriptor that indicates the logical connection used to receive the response from the drive 20. The transfer destination management unit 102 acquires an entry, where the acquired socket descriptor is recorded as the logical connection on the drive side, from the transfer correspondence table 122. Then, the transfer destination management unit 102 notifies the transfer unit 103 of the logical connection recorded as the logical connection on the server side in the acquired entry, as the logical connection of the transfer destination to transfer the response. The transfer destination management unit 102 deletes the acquired entry from the transfer destination management unit 102. A transmission source of a request means a server 3 which has transmitted the request to the relay apparatus 1.

The connection maintaining unit 104 establishes a logical connection with the drive 20 according to content set in the drive connection table 121. The connection maintaining unit 104 establishes a logical connection with each drive 20 at start-up of the system or the like. Further, the connection maintaining unit 104 maintains the established logical connection. To maintain a logical connection is to re-establish a logical connection with a drive 20 in a case where the logical connection with the drive 20 is disconnected for some reason (any reason). When the connection maintaining unit 104 establishes the logical connection or re-establishes the logical connection, the connection maintaining unit 104 records the socket descriptor in the drive connection table 121. When the connection maintaining unit 104 establishes the logical connection or re-establishes the logical connection, the connection maintaining unit 104 uses the communication unit 101.

Next, an operation of the relay apparatus 1 according to the first embodiment will be described.

Figure 8:
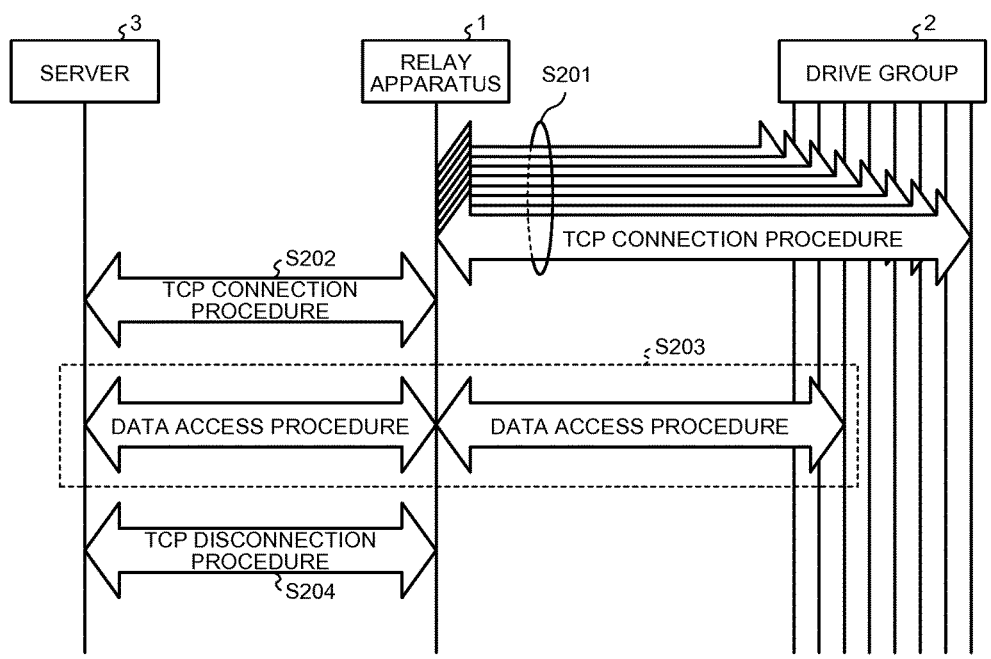
FIG. 8 is a diagram illustrating an example of a communication sequence of the relay apparatus of the first embodiment.

FIG. 8 is a diagram illustrating an example of a communication sequence of the relay apparatus 1 of the first embodiment. First, the connection maintaining unit 104 in the relay apparatus 1 performs a TCP connection procedure between the relay apparatus 1 and each drive 20 based on description of the drive connection table 121 (S201). The connection maintaining unit 104 establishes a logical connection with each drive 20 by the processing of S201. For example, according to the example of the drive connection table 121 in FIG. 6, the connection maintaining unit 104 connects to No. 6000 port of the drive 20 to which an IP address "192.168.0.1" is assigned, and after a logical connection is established between the drive 20 to which the IP address "192.168.0.1" is assigned and the relay apparatus 1, the connection maintaining unit 104 records a socket descriptor "3" that indicates the established logical connection in the drive connection table 121. Processing when an error occurs or a redundant configuration can be implemented in any manner.

Subsequently, the server 3 performs a TCP connection procedure between the server 3 and the relay apparatus 1 (S202), and a logical connection between the server 3 that performs the TCP connection procedure and the relay apparatus 1 is established. The sequence of the processing of S201 and the processing of S202 is not limited to the sequence described above. Here, as one example, an example in which the TCP connection procedure is performed between one server 3 and the relay apparatus 1 will be described. However, two or more servers 3 among a plurality of servers 3 can perform the TCP connection procedure.

After the processing of S201 and the processing of S202, a data access procedure through the relay apparatus 1 is performed between the server 3 that has established a logical connection with the relay apparatus 1 and one of a plurality of drives 20 (S203). Thereafter, the server 3 that has established the logical connection with the relay apparatus 1 can perform a TCP disconnection procedure to disconnect the logical connection (S204). The processing of S204 can be performed at a timing desired by the server 3.

Figure 9:
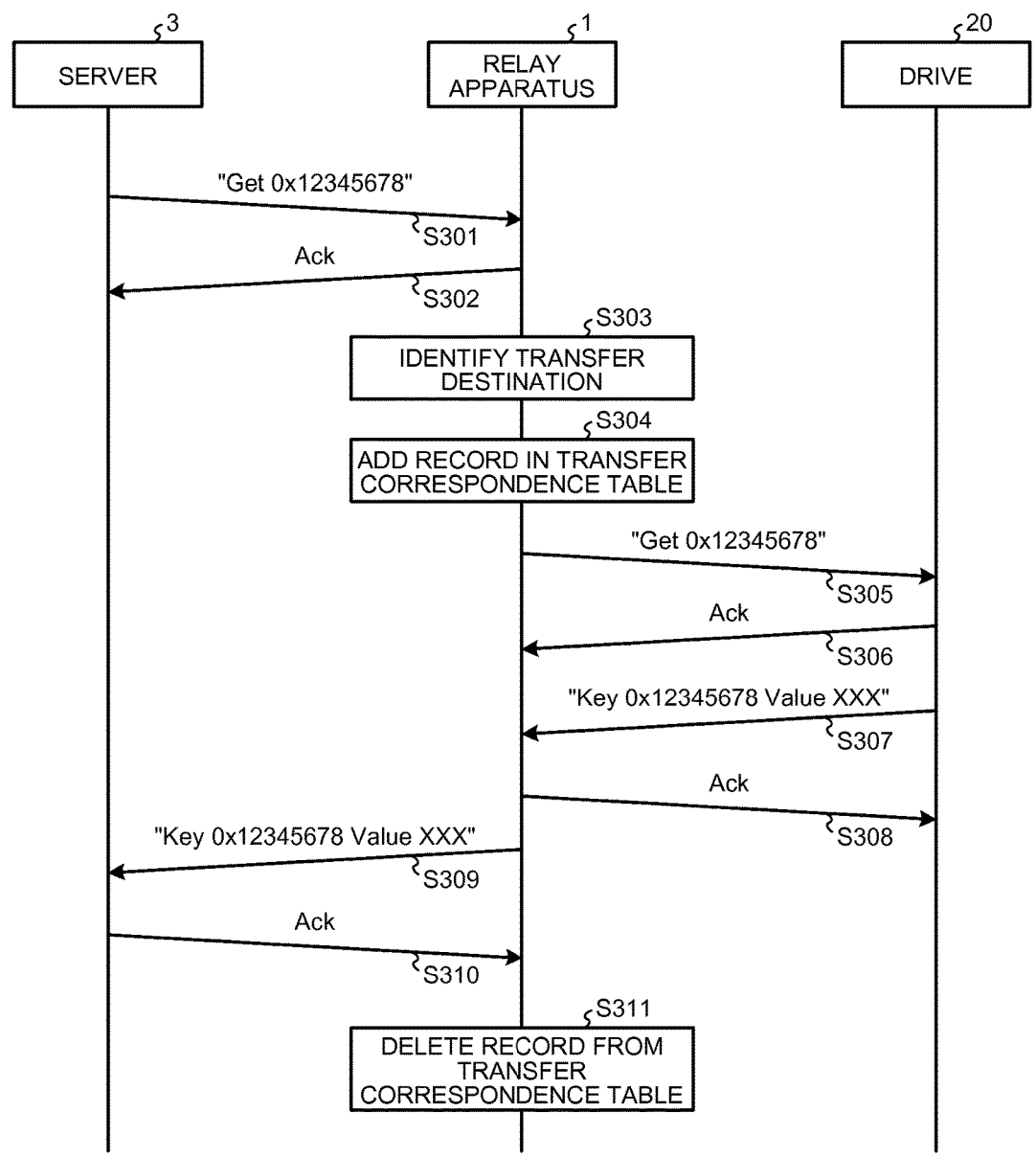
FIG. 9 is an example of a communication sequence illustrating, in further detail, a data access procedure of the first embodiment.

FIG. 9 is an example of a communication sequence illustrating, in further detail, the data access procedure of S203. For example, the server 3 transmits "Get 0x12345678" which is a read request including a character string "0x12345678" as a request key (S301). The communication unit 101 in the relay apparatus 1 transmits Ack for the received request to the server 3 (S302). The transfer destination management unit 102 identifies a logical connection of a transfer destination of the request (S303).

Specifically, the transfer destination management unit 102 identifies a range, in which the request key is included, from among ranges that are set for each drive 20 by the drive connection table 121. For example, the key "0x12345678" includes "000" as a value of the least significant three bits. According to the example of FIG. 6, the logical connection identified by the socket descriptor "3" is identified as the logical connection of the transfer destination of the request "Get 0x12345678".

After the processing of S303, the transfer destination management unit 102 adds a record in the transfer correspondence table 122 (S304). Specifically, the transfer destination management unit 102 records the socket descriptor (here, for example, "11"), which indicates the logical connection between the server 3 being the transmission source of the request "Get 0x12345678" and the relay apparatus 1, and the identified socket descriptor "3" in the transfer correspondence table 122. FIG. 7 illustrates the transfer correspondence table 122 in a state in which the socket descriptor "11" and the socket descriptor "3" are recorded as a pair. In the transfer correspondence table 122 in FIG. 7, a pair of the socket descriptor "12" and the socket descriptor "8" as well as a pair of the socket descriptor "13" and the socket descriptor "4" are further recorded.

The transfer unit 103 identifies the logical connection of the socket descriptor "3", which is the logical connection of the transfer destination of the request "Get 0x12345678", based on the pairs recorded in the transfer correspondence table 122. Then, the transfer unit 103 transfers the request "Get 0x12345678" to the identified logical connection of the socket descriptor "3" (S305). By the processing of S305, the request "Get 0x12345678" is transferred to the drive 20 connected to the logical connection of the socket descriptor "3" (hereinafter simply referred to as the drive 20 in FIG. 9).

The drive 20 transmits Ack for the received request to the relay apparatus 1 (S306). Then, the drive 20 searches for data (here, "XXX") which corresponds to the request key "0x12345678" and which is held in a storage area included in the drive 20. The drive 20 transmits a response "Key 0x12345678 Value XXX" to the relay apparatus 1 (S307).

The communication unit 101 in the relay apparatus 1 transmits Ack for the received response to the drive 20 (S308). The transfer unit 103 identifies the logical connection of the socket descriptor "11", which is the logical connection of the transfer destination of the response "Key 0x12345678 Value XXX", based on the pairs recorded in the transfer correspondence table 122. Then, the transfer unit 103 transfers the response "Key 0x12345678 Value XXX" to the identified logical connection of the socket descriptor "11" (S309). The server 3 transmits Ack for the received response to the relay apparatus 1 (S310).

When the communication unit 101 in the relay apparatus 1 receives the Ack for the transferred response, the transfer destination management unit 102 recognizes completion of the transfer of the response. When the transfer destination management unit 102 recognizes the completion of the transfer of the response, the transfer destination management unit 102 deletes a corresponding pair recorded in the transfer correspondence table 122 (S311). Specifically, the transfer destination management unit 102 deletes the pair of the socket descriptor "11" and the socket descriptor "3", which is the pair corresponding to the transfer where the response is completed, from the transfer correspondence table 122.

After performing the data access procedure (S203), the server 3 may start a new data access procedure (S203) without performing the TCP disconnection procedure (S204).

As described above, according to the first embodiment, when a request from the server 3 is received, the transfer destination management unit 102 identifies the drive 20 that is the transfer destination of the request, from among a plurality of drives 20. The transfer unit 103 transfers the request to the identified drive 20 that is the transfer destination of the request. Thereby, each drive 20 only has to be connected to the relay apparatus 1 by one logical connection, and each drive 20 may not necessarily maintain a direct logical connection with each server 3. Therefore, decrease of data input/output speed to/from each drive 20, which is caused by maintaining the logical connections, is prevented.

Further, the transfer destination management unit 102 records a correspondence between the server 3 that is the request transmission source and the drive 20 that is the request transfer destination in the transfer correspondence table 122. The transfer unit 103 identifies the server 3 that is the transfer destination of the response to the request based on the transfer correspondence table 122. In this way, the relay apparatus 1 can easily transfer the response to the request to the server 3 that is the transmission source of the request. In the above description, the correspondence between the server 3 that is the request transmission source and the drive 20 that is the request transfer destination is recorded in the transfer correspondence table 122 by using a pair of the socket descriptors. Information other than the socket descriptors can be employed as far as the information can identify the correspondence between the server 3 that is the request transmission source and the drive 20 that is the request transfer destination.

Further, when transferring the request, the transfer destination management unit 102 records the pair in the transfer correspondence table 122. When transferring the response, the transfer destination management unit 102 deletes the pair from the transfer correspondence table 122. The timing when adding the pair may not necessarily be before transferring the request. For example, the transfer destination management unit 102 may record the pair while the request is being transferred or immediately after the request is transferred. Further, the timing when deleting the pair may not necessarily be after completing the transfer of the response. For example, the transfer destination management unit 102 may delete the pair while the response is being transferred or immediately before the response is transferred.

Second Embodiment

Figures 10, 11:
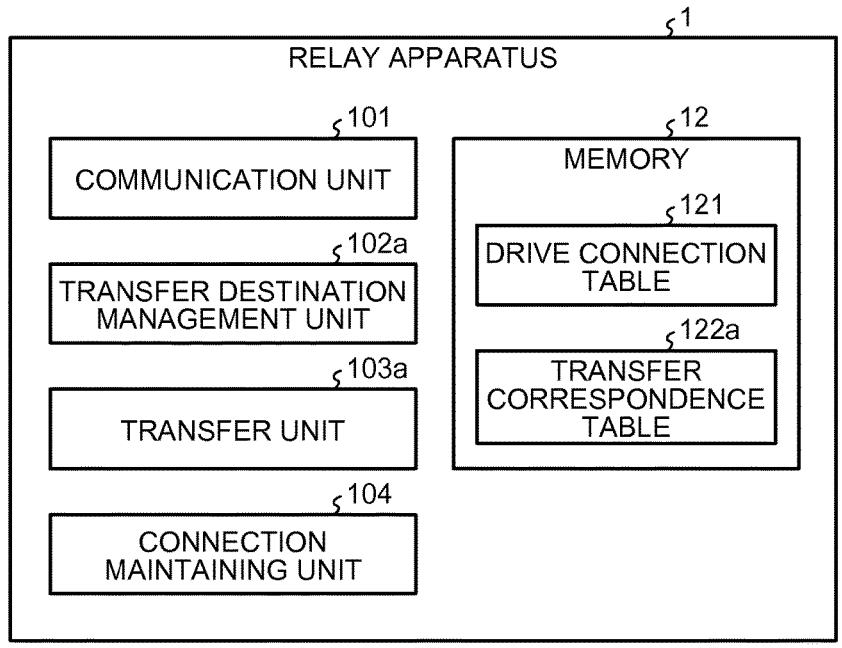
FIG. 10 is a diagram illustrating an example of a functional configuration of a relay apparatus of a second embodiment.
FIG. 11 is a diagram illustrating a data configuration example of a transfer correspondence table of the second embodiment.

FIG. 10 is a diagram illustrating an example of a functional configuration of a relay apparatus 1 of the second embodiment. Here, the same names and the same reference numerals as those in the first embodiment are given to the components same as those in the first embodiment, and the description thereof will not be repeated. A relay apparatus 1 of the second embodiment includes a communication unit 101, a transfer destination management unit 102a, a transfer unit 103a, and a connection maintaining unit 104. In a memory 12, a drive connection table 121 and a transfer correspondence table 122a are stored.

FIG. 11 is a diagram illustrating a data configuration example of the transfer correspondence table 122a of the second embodiment. In the transfer correspondence table 122a, a pair of the socket descriptor indicating the logical connection on the server side and the socket descriptor indicating the logical connection on the drive side is associated with a key included in a request (a request key). After determining the logical connection of the transfer destination of the request, the transfer destination management unit 102a records a pair of the socket descriptor of the logical connection on the server side and the socket descriptor of the logical connection on the drive side, in the transfer correspondence table 122a in association with the request key included in the request. The transfer unit 103a searches the transfer correspondence table 122a by using a combination of the logical connection on the drive side and the request key in order to identify the logical connection of the transfer destination of the response.

According to the example of FIG. 11, requests are transmitted respectively from a server 3 connected with the relay apparatus 1 by the logical connection of the socket descriptor "12" and the server 3 connected with the relay apparatus 1 by the logical connection of the socket descriptor "11" to the drive 20 connected with the relay apparatus 1 by the logical connection of the socket descriptor "8", and the relay apparatus 1 has not transferred the responses to these requests. When trying to identify the logical connection of the transfer destination of the response by using only the logical connection on the drive side, it is not possible to identify whether the logical connection of the transfer destination of the response from the drive 20 connected with the relay apparatus 1 by the logical connection of the socket descriptor "8" is the logical connection of the socket descriptor "11" or the logical connection of the socket descriptor "12". In the second embodiment, the request key is added as information to identify the logical connection of the transfer destination of the response. For example, when the response from the drive 20 connected with the relay apparatus 1 by the logical connection of the socket descriptor "8" is a response to a request to read data corresponding to a key "0x0123abcd", it is possible to identify the logical connection of the socket descriptor "12" as the logical connection of the transfer destination of the relevant response.

In summary, in the second embodiment, the transfer unit 103a identifies the logical connection of the transfer destination of the response by using a pair of the socket descriptor of the logical connection on the drive side and added information. Thereby, even when requests are transmitted from two or more different servers 3 to the same drive 20, it is possible to uniquely identify the logical connection of the transfer destination of the response. Note that the information to identify the logical connection of the transfer destination of the response is not limited to only the request key.

Figure 12:
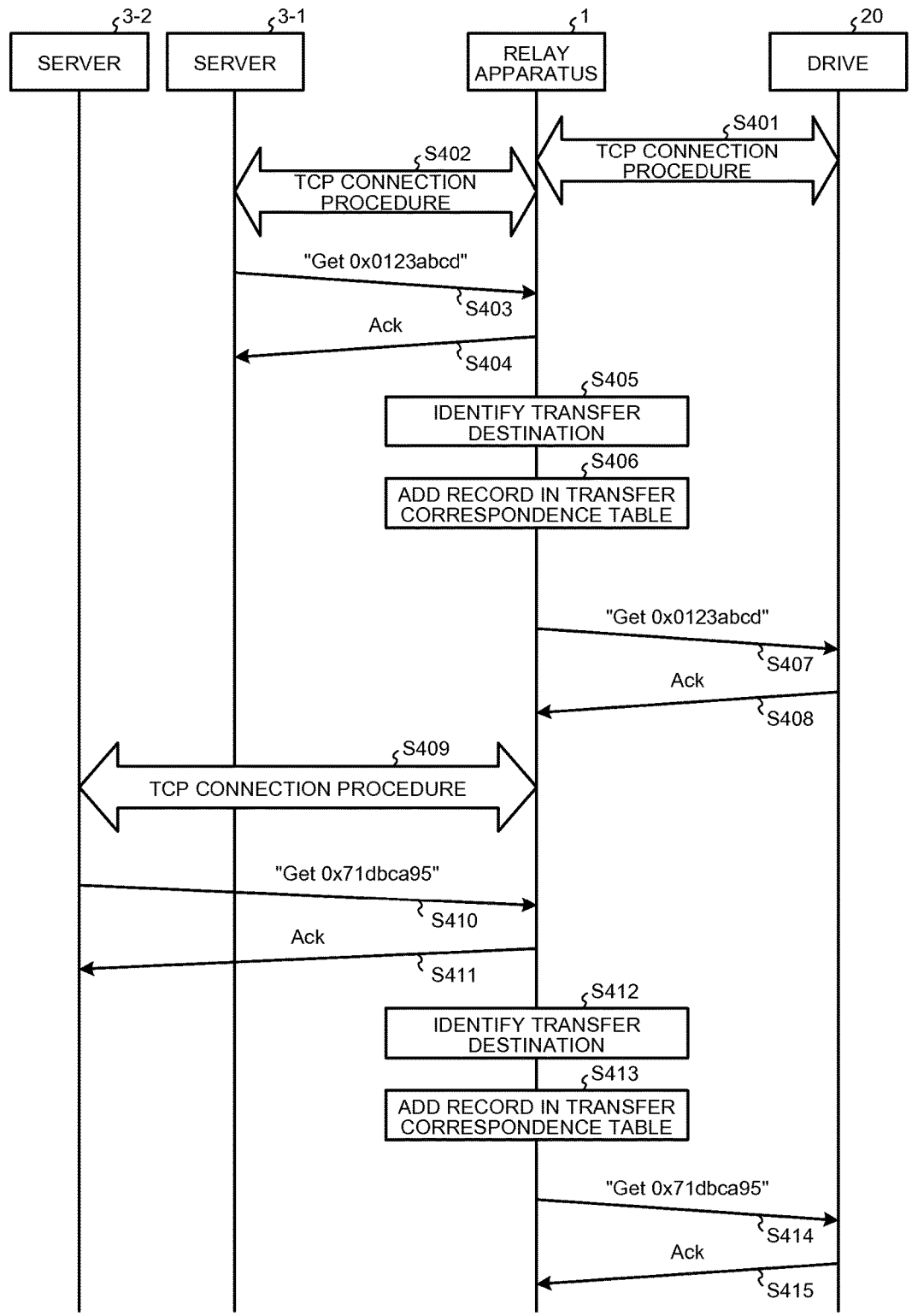
FIG. 12 is a diagram illustrating an example of a communication sequence of the second embodiment.
Figure 13:
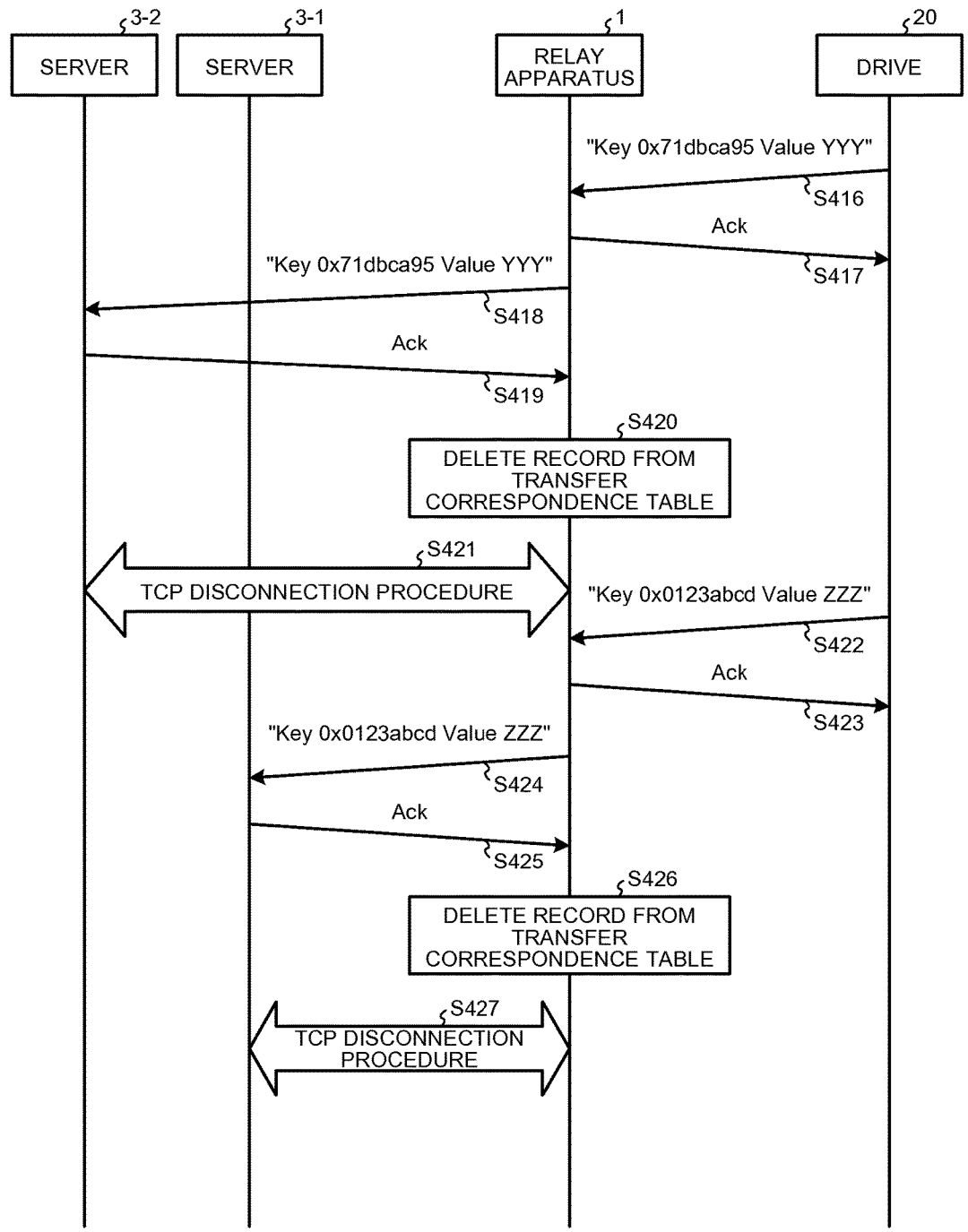
FIG. 13 is a diagram illustrating an example of a communication sequence of the second embodiment.

FIGS. 12 and 13 are diagrams illustrating an example of a communication sequence of the second embodiment. In FIGS. 12 and 13, an example in which requests are transmitted from two servers 3 (a server 3-1 and a server 3-2) to one drive 20 will be described.

First, the connection maintaining unit 104 in the relay apparatus 1 performs a TCP connection procedure between the relay apparatus 1 and the drive 20 (S401). Here, it is assumed that the socket descriptor "8" is assigned to the logical connection established by the processing of S401.

The server 3-1 performs a TCP connection procedure between the server 3-1 and the relay apparatus 1 (S402). Here, it is assumed that the socket descriptor "12" is assigned to the logical connection established by the processing of S402.

The server 3-1 transmits "Get 0x0123abcd", which is a read request including a character string "0x0123abcd" as a request key, to the relay apparatus 1 (S403). The communication unit 101 in the relay apparatus 1 transmits Ack for the received request to the server 3-1 (S404). The transfer destination management unit 102a identifies the logical connection of the transfer destination of the request in the same manner as the processing of S303 (S405).

Following the processing of S405, the transfer destination management unit 102a adds a record in the transfer correspondence table 122a (S406). Specifically, the transfer destination management unit 102 stores a pair of the socket descriptor (here, the socket descriptor "12") indicating the logical connection between the server 3-1 and the relay apparatus 1 and the socket descriptor (here, the socket descriptor "8") indicating the logical connection identified by the processing of S405, in the transfer correspondence table 122a in association with the request key "0x0123abcd".

The transfer unit 103a identifies the logical connection of the socket descriptor "8", which is the logical connection of the transfer destination of the request "Get 0x0123abcd", based on the records in the transfer correspondence table 122a. For example, the transfer unit 103a identifies the logical connection of the socket descriptor "8" as the logical connection of the transfer destination of the request "Get 0x0123abcd", by referring to the transfer correspondence table 122a using the socket descriptor "12", which indicates the logical connection on the server side used to transfer the request "Get 0x0123abcd", and the request key "0x0123abcd". The transfer unit 103a transfers the request "Get 0x0123abcd" to the identified logical connection of the socket descriptor "8" (S407). The drive 20 transmits Ack for the received request to the relay apparatus 1 (S408).

For example, at a timing after the processing of S408, the server 3-2 performs a TCP connection procedure between the server 3-2 and the relay apparatus 1 (S409). Here, it is assumed that the socket descriptor "11" is assigned to the logical connection established by the processing of S409. The server 3-2 transmits "Get 0x71dbca95", which is a read request including a character string "0x71dbca95" as a request key, to the relay apparatus 1 (S410). The communication unit 101 in the relay apparatus 1 transmits Ack for the received request to the server 3-2 (S411). The transfer destination management unit 102a identifies the logical connection of the transfer destination of the request in the same manner as the processing of S303 (S412). Then, the transfer destination management unit 102a adds a record in the transfer correspondence table 122a (S413). Specifically, the transfer destination management unit 102a stores a pair of the socket descriptor (here, the socket descriptor "11") indicating the logical connection between the server 3-2 and the relay apparatus 1 and the socket descriptor (here, the socket descriptor "8") indicating the logical connection identified by the processing of S412 in the transfer correspondence table 122a in association with the request key "0x71dbca95".

Following the processing of S413, the transfer unit 103a identifies the logical connection of the socket descriptor "8", which is the logical connection of the transfer destination of the request "Get 0x71dbca95", based on the records in the transfer correspondence table 122a. Then, the transfer unit 103a transfers the request "Get 0x71dbca95" to the identified logical connection of the socket descriptor "8" (S414). The drive 20 transmits Ack for the received request to the relay apparatus 1 (S415). Then, the drive 20 searches for data (here, "YYY") which corresponds to the request key "0x71dbca95" and which is held in a storage area included in the drive 20. The drive 20 transmits a response "Key 0x71dbca95 Value YYY" to the relay apparatus 1 (S416).

The communication unit 101 in the relay apparatus 1 transmits Ack for the received response to the drive 20 (S417). Then, the transfer unit 103a identifies the logical connection of the transfer destination of the response "Key 0x71dbca95 Value YYY". Specifically, the transfer unit 103a identifies the logical connection of the socket descriptor "11" as the logical connection of the transfer destination of the response "Key 0x71dbca95 Value YYY", by referring to the transfer correspondence table 122a by using the socket descriptor "8" indicating the logical connection on the drive side which is used to transfer the response "Key 0x71dbca95 Value YYY" and the request key "0x71dbca95". The transfer unit 103a transfers the response "Key 0x71dbca95 Value YYY" to the logical connection connected to the server 3-2, which is the identified logical connection (S418). The server 3-2 transmits Ack for the received response to the relay apparatus 1 (S419).

When the communication unit 101 in the relay apparatus 1 receives the Ack for the transferred response "Key 0x71dbca95 Value YYY", the transfer destination management unit 102a deletes a corresponding record recorded in the transfer correspondence table 122a (S420). Specifically, the transfer destination management unit 102a deletes, from the transfer correspondence table 122a, the record in which the socket descriptor "11", the socket descriptor "8", and the request key "0x71dbca95" are associated with each other and which is a record related to a transfer where the response is completed.

After the processing of S420, the server 3-2 performs a TCP disconnection procedure that disconnects the logical connection with the relay apparatus 1 (S421). The logical connection of the socket descriptor "11" is disconnected by the processing of S421.

After the processing of S421, the drive 20 searches for data (here, "ZZZ") which corresponds to the request key "0x0123abcd" and which is held in the storage area included in the drive 20. The drive 20 transmits a response "Key 0x0123abcd Value ZZZ" to the relay apparatus 1 (S422).

The communication unit 101 in the relay apparatus 1 transmits Ack for the received response to the drive 20 (S423). Then, the transfer unit 103a identifies the logical connection of the transfer destination of the response "Key 0x0123abcd Value ZZZ". Specifically, the transfer unit 103a identifies the logical connection of the socket descriptor "12" as the logical connection of the transfer destination of the response "Key 0x0123abcd Value ZZZ", by referring to the transfer correspondence table 122a using the socket descriptor "8", which indicates the logical connection on the drive side used to transfer the response "Key 0x0123abcd Value ZZZ", and the request key "0x0123abcd". The transfer unit 103a transfers the response "Key 0x0123abcd Value ZZZ" to the logical connection connected to the server 3-1, which is the identified logical connection (S424). The server 3-2 transmits Ack for the received response to the relay apparatus 1 (S425).

When the communication unit 101 in the relay apparatus 1 receives the Ack for the transferred response "Key 0x0123abcd Value ZZZ", the transfer destination management unit 102a deletes a corresponding record recorded in the transfer correspondence table 122a (S426). Specifically, the transfer destination management unit 102a deletes, from the transfer correspondence table 122a, the record in which the socket descriptor "12", the socket descriptor "8", and the request key "0x0123abcd" are associated with each other and which is a record related to a transfer where the response is completed.

After the processing of S426, the server 3-1 performs the TCP disconnection procedure that disconnects the logical connection with the relay apparatus 1 (S427). The logical connection of the socket descriptor "12" is disconnected by the processing of S427.

As described above, according to the second embodiment, the transfer correspondence table 122a is added with new information in addition to the pair of the socket descriptor indicating the logical connection on the server side and the socket descriptor indicating the logical connection on the drive side as information indicating a transfer path. Here, as an example, the request key is added as the new information. Thereby, even when requests are transmitted from a plurality of servers 3 to the same drive 20, the transfer destination management unit 102a can uniquely identify the server 3 of the transfer destination of the response.

In the example described above, the request key is recorded in the transfer correspondence table 122a.

Third Embodiment

Figure 14:
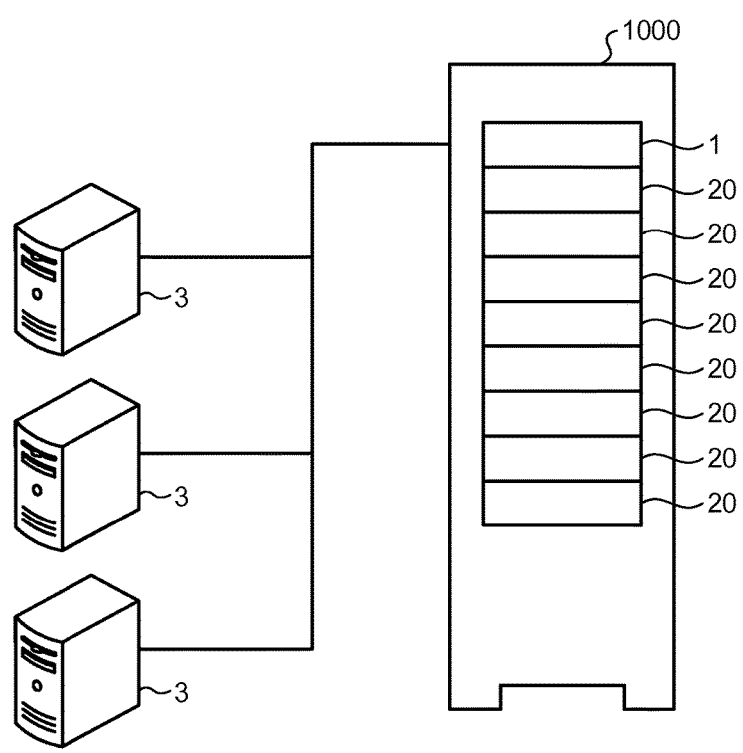
FIG. 14 is a diagram illustrating a mounting example of a relay apparatus.

FIG. 14 is a diagram illustrating a mounting example of a relay apparatus 1. The relay apparatus 1 is mounted in a disk array system 1000. The disk array system 1000 includes a backplane (not illustrated in FIG. 14) inside thereof and the relay apparatus 1 is attached to the backplane. A plurality of drives 20 are mounted in the disk array system 1000. Each drive 20 is physically connected to the relay apparatus 1 through the backplane. The disk array system 1000 is physically connected to a plurality of servers 3.

The relay apparatus 1 has the configuration of the first embodiment or the configuration of the second embodiment. The relay apparatus 1 establishes a logical connection with each drive 20. Each server 3 establishes a logical connection with the relay apparatus 1. The relay apparatus 1 transfers a request from each server 3 to any one of the drives 20. The relay apparatus 1 transfers a response from each drive 20 to any one of the servers 3. Thereby, decrease of data input/output speed to/from each drive 20, which is caused by maintaining the logical connections, is prevented.

The relay apparatus 1 may not necessarily be attached to the backplane in a form of a unit. For example, the relay apparatus 1 may be formed with one or more chips, and the relay apparatus 1 formed with one or more chips may be mounted on the backplane.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A relay apparatus connectable to a server and a plurality of storage devices, the relay apparatus comprising:
   a storage unit that stores first information including information of each of the plurality of storage devices therein, the plurality of storage devices each being physically connected to the relay apparatus;
   a connection maintaining unit that, prior to receiving a request from the server, establishes, based on the first information, first logical connections each logically connecting the relay apparatus to a storage devices among the plurality of storage devices each of which the information is included in the first information, adds information of each of the first logical connections in the first information, and maintains the established first logical connections;
   a transfer destination management unit that, receives the request from the server while the connection maintaining unit is maintaining the first logical connections, identifies a second logical connection based on the first information, the second logical connection being a logical connection connected to a first storage device among the first logical connections, the first storage device being a storage device of a transmission destination of the request among the plurality of storage devices; and
   a transfer unit that transfers the received request to the first storage device through the second logical connection, wherein
   the plurality of storage devices manage data by using key-value storage,
   the request includes a request key,
   in the first information, a key range is associated with the first storage device,
   the connection maintaining unit associates, in the first information, each of the first logical connections with a corresponding storage device among the plurality of storage devices, and
   the transfer destination management unit identifies the second logical connection based on a comparison between the request key included in the request and the key range.

2. The relay apparatus according to claim 1, wherein
   the relay apparatus is connected to a plurality of servers,
   the storage unit stores second information therein,
   the transfer destination management unit records a correspondence between a third logical connection and the second logical connection in the second information, the third logical connection being a logical connection connecting the relay apparatus to a first server, the first server being a server of a transmission source of the request among the plurality of servers, and
   when the transfer unit receives, from the first storage device, a response to the request, the transfer unit identifies the third logical connection based on the second information, and transfers the received response to the first server through third logical connection.

3. The relay apparatus according to claim 2, wherein
   the transfer destination management unit
   records the correspondence between the third logical connection and the second logical connection in response to receiving the request from the first server, and
   deletes the correspondence between the third logical connection and the second logical connection in response to receiving the response from the first storage device.

4. The relay apparatus according to claim 2, wherein
   the request and the response include third information,
   the correspondence recorded in the second information includes the third information, and
   the transfer unit searches the second information by using the second logical connection and the third information included in the response.

5. The relay apparatus according to claim 4, wherein
   the third information is a request key.

6. A relay apparatus connectable to a server, the relay apparatus comprising:
   a storage unit that stores first information including information of each of a plurality of storage devices physically connected to the relay apparatus;
   a connection maintaining unit that prior to receiving a request from the server, establishes logical connections, based on the first information, connecting to the plurality of storage devices, adds information of each of the logical connections to the first information, and maintains the logical connections;
   a transfer destination management unit that, in response to receiving a request from the server, identifies, among the logical connections which are being maintained, a logical connection connecting to one storage device among the plurality of storage devices based on the request received from the server;
   a transfer unit that transfers the received request to the one storage device through the logical connection, and wherein
   the plurality of storage devices manage data by using key-value storage, and
   the transfer destination management unit identifies the logical connection based on a key included in the received request from the server.

7. The relay apparatus according to claim 6, wherein
the relay apparatus is connected to a plurality of servers, and
the relay apparatus stores a transfer path of the request, the transfer path including a correspondence between the logical connection and a logical connection connecting the relay apparatus to a server of a transfer source of the request among the plurality of servers, identifies a server of a transfer destination of a response from the one storage device based on the stored transfer path, the response being a response to the request, and transfers the response to the identified server.

8. The relay apparatus according to claim 1, wherein the connection maintaining unit establishes the first logical connections before a logical connection between the relay apparatus and the server is established.

9. The relay apparatus according to claim 1, wherein each of the first logical connections is a TCP connection.

10. The relay apparatus according to claim 6, wherein the relay apparatus establishes the logical connections before a logical connection between the relay apparatus and the server is established.

11. The relay apparatus according to claim 6, wherein each of the logical connections is a TCP connection.

* * * * *